(12) United States Patent
Thomas et al.

(10) Patent No.: US 8,357,012 B2
(45) Date of Patent: Jan. 22, 2013

(54) ASSEMBLY FOR PERMITTING POWER OVER ETHERNET CONNECTION

(75) Inventors: David Thomas, Cheshire (GB); David Niall MacFadyen, Cheshire (GB); Hans-Juergen Niethammer, Kirchheimbolanden (DE)

(73) Assignee: Tyco Electronics UK Ltd, Wiltshire (GB)

( * ) Notice: Subject to any disclaimer, the term of this patent is extended or adjusted under 35 U.S.C. 154(b) by 1207 days.

(21) Appl. No.: 12/084,446

(22) PCT Filed: Nov. 3, 2006

(86) PCT No.: PCT/GB2006/004109
§ 371 (c)(1),
(2), (4) Date: May 1, 2008

(87) PCT Pub. No.: WO2007/052041
PCT Pub. Date: May 10, 2007

(65) Prior Publication Data
US 2009/0100210 A1    Apr. 16, 2009

(30) Foreign Application Priority Data
Nov. 4, 2005 (GB) .................... 0522554.5

(51) Int. Cl.
*H01R 24/60* (2011.01)
*G06F 1/26* (2006.01)
(52) U.S. Cl. ....................................... 439/676; 713/300
(58) Field of Classification Search .................. 713/300; 439/676
See application file for complete search history.

(56) References Cited

U.S. PATENT DOCUMENTS
3,217,211 A    11/1965  Norden
4,585,285 A     4/1986  Martens
(Continued)

FOREIGN PATENT DOCUMENTS
EP    0806843 A2    11/1997
GB    2380868 A     4/2003

OTHER PUBLICATIONS
Search Report for International Application No. PCT/GB2006/004109 issued by the European Patent Office on Jun. 3, 2007.
(Continued)

*Primary Examiner* — Kim Huynh
*Assistant Examiner* — Eric Chang
(74) *Attorney, Agent, or Firm* — Faegre Baker Daniels LLP

(57) ABSTRACT

An assembly for permitting "Power-over-Ethernet" (PoE) connection between a PoE control device and the components of a cabling network includes a patch panel or conventional design. The patch panel includes on a front face thereof a plurality of first sockets that are each open on the front face such that a plug inserted into the first socket is connectable to a data cable via a data transmission path forming part of the patch panel. The assembly includes a distribution matrix that is securable onto the front side of the patch panel, the distribution matrix including a plurality of through-going apertures corresponding in number and location to the first sockets of the patch panel such that when the matrix member is secured on the patch panel a said aperture is functionally in register with each of the first sockets. The distribution matrix includes a power bus supported thereby. The assembly includes one or more connector devices, and the power bus is connectable to a PoE controller.

19 Claims, 2 Drawing Sheets

U.S. PATENT DOCUMENTS

| | | |
|---|---|---|
| 5,469,335 A | 11/1995 | Kluth |
| 7,207,846 B2 * | 4/2007 | Caveney et al. .............. 439/676 |
| 7,455,527 B2 * | 11/2008 | Nordin et al. ................... 439/49 |
| 2003/0040202 A1 | 2/2003 | Norris et al. |
| 2003/0061552 A1 | 3/2003 | Ke |
| 2004/0002266 A1 | 1/2004 | Hinkle |
| 2005/0215119 A1 | 9/2005 | Kaneko |

OTHER PUBLICATIONS

Search Report for Great Britain Application No. GB0522554.5 issued by the UK Patent Office on Feb. 23, 2006.

* cited by examiner

ASSEMBLY FOR PERMITTING POWER OVER ETHERNET CONNECTION

BACKGROUND

This invention concerns an assembly for permitting "Power-over-Ethernet" (PoE) (also sometimes referred to as "power over LAN") connection.

PoE is a subject of rapidly growing interest at the present time. The technology involves the provision of electrical power using Ethernet cabling such as that defining a local area network (LAN).

A typical "Category 5" data transmission cable (which is a type very commonly used in LAN cabling applications) consists of four twisted pairs of conductor wire. These are used to transmit data in the form of voltages whose maximum and minimum values are dictated by internationally agreed standards.

It is possible to use data cables of this kind for the provision of electrical power as well as data, without reducing the ability of the cables simultaneously to transmit data reliably and without crosstalk.

This is achieved primarily through the use of both active control elements and certain passive components (such as centre-tapped secondary windings of transformers forming part of the LAN) that permit the connection of power supplies to the data cables. The active and passive components limit the voltages transmitted via the cables so that they lie within the maximum and minimum values permitted under the aforesaid standards.

In some applications of PoE technology the transmission of data and electrical power occurs simultaneously using the same pairs of the cables. In other applications there is a mix of uses such that some of the pairs are used for mixed data and power transmission and others are dedicated to the transmission of either power or data.

Various devices are capable of operating at the power levels provided using PoE technology. Such devices if connected to the node of a LAN may draw operating power from the network without any need for a separate connection to mains power. Such devices include internet protocol (JP) telephones, charge-coupled device (CCD) cameras, sensors of alarm systems, card readers and similar apparatuses. There is even available a personal computer that operates at the power levels available from a PoE arrangement.

Also a PoE-enabled network may provide backup power to devices, such as conventional personal computers, at times when mains power is unavailable. In such applications the active devices controlling the distribution of power over the LAN in question can be arranged to send network messages to devices connected at its nodes, thereby initiating modes of operation that minimise power consumption.

The advantages of providing power over a LAN or Ethernet are such that interest in this technology is growing rapidly. However, many buildings and other locations where network cabling is installed do not incorporate the active and passive components needed to permit the transmission of power.

The structured (i.e. built-in) cabling of a new building is nowadays intended to remain in use for 10-20 years. Therefore in the majority of applications it would be uneconomical to replace it with cabling incorporating the parts needed to provide Power over Ethernet transmission.

It is desirable to be able to upgrade the electronic components needed on a more frequent basis than the 10-20 year life of structured LAN cabling.

SUMMARY

Thus overall there is a need to provide LAN components that permit ready upgrading of the LAN to incorporate electronics modules and parts as desired.

According to a first aspect of the invention there is provided an assembly for permitting PoE connection between a PoE control device and the components of a cabling network, the assembly comprising:

a network connection device including one or more support members supporting a plurality of cable terminations that are each operatively connectable to a respective data cable for the transmission of data, each cable termination being operatively connected to a respective first socket that is open on an in use front side of the network connection device such that a plug inserted into the first socket is connectable to a said data cable via a data transmission path forming part of the network connection device;

a distribution matrix that is securable onto the front side of the network connection device, the distribution matrix including a plurality of through-going apertures corresponding in number and location to the first sockets of the network connection device such that when the matrix member is secured on the network connection device a said aperture is functionally in register with each of the first sockets, and the distribution matrix including a power bus supported thereby; and one or more connector devices, the power bus of the distribution matrix being connectable to a PoE controller and the or each connector device being capable of connecting:

via one or more said through-going apertures to a said first socket; and to the said power bus to receive power and/or power signals in dependence on the output of a PoE control device when connected to the power bus.

As used herein the term "network connection device" includes but is not limited to a patch panel or similar device.

An advantage of the above-described arrangement is that it readily permits the upgrading of a non-PoE LAN to permit operation as a PoE installation.

This may be achieved even if the LAN cabling and the network connection device are conventional or largely conventional components, since the components needed to provide PoE functionality may be added by way of the distribution matrix, the PoE control device and the connector device(s). The addition of these components to the LAN can occur months or even years after installation of the basic LAN elements. This is true even when for example the LAN includes a patch panel of an entirely conventional design, since the distribution matrix may be secured to it by any convenient means such as clips, fasteners, brackets or even adhesive compounds.

When the assembly includes one or more fasteners for securing the network connection device and the distribution matrix together the or each fastener preferably includes a pair of mutually mateable connector parts secured respectively on the network connection device and the distribution matrix.

Such an arrangement assists in providing rapid, reliable connection together of the distribution matrix and the network connection device.

Conveniently the mutually mateable connector parts define a cable connection for connecting a cable from a PoE control device to the power bus of the distribution matrix, at least the connector part secured on the distribution matrix being operatively connected to the power bus.

This arrangement provides an effective way of ensuring that the power signals generated by the PoE control device are available for transmission via the LAN as desired.

Preferably the distribution matrix is elongate and the power bus extends along the distribution matrix approximately from one end towards the other. As a result the distribution matrix may readily be made in a shape and size that matches that of the network connection device (e.g. a conventionally-sized patch panel) with which it is intended to be used. This in turn means that the distribution matrix need not occupy any greater area, in a patch cabinet, than the patch panel itself while permitting the power bar to lie conveniently close to the sockets of the patch panel. This means that the power signals generated by the PoE controller may easily be distributed to the sockets.

It is also preferable that the power bus is embedded in the distribution matrix, although in alternative embodiments within the scope of the invention the power bus may be e.g. lain on an exterior surface of the distribution matrix.

When the power bus is so embedded the distribution matrix preferably includes formed therein a plurality of power bus apertures each permitting connection of a said connector device to the power bus. Thus the power bus may be largely surrounded by the material of the distribution matrix such that access to it is possible only via the power bus apertures. This enhances the safety of the assembly and reduces the risk of corruption of the signals transmitted.

It is particularly preferable that the number of power bus apertures corresponds to the number of through-going apertures formed in the distribution matrix; and optionally that each said power bus aperture lies adjacent a said through-going aperture of the distribution matrix.

These features allow the ready distribution of power signals from the power bus to any of the first sockets of the network connection device, using a connector device as defined herein.

To this end preferably the or each connector device includes a respective pair of protruding pins, a first of which is capable of extending through a said through-going aperture in the distribution matrix to engage a said first socket of the network connection device; and a second of which is capable simultaneously of engaging the power bus via a said power bus aperture.

This arrangement takes advantage of the proximate locations of the power bus apertures, the through-going apertures and the first sockets to permit the simultaneous connection of the connector devices to via these respective apertures.

In practical embodiments of the assembly according to the invention the or each connector device includes a housing within which the first and second pins are operatively connected. Even more preferably such connection is by way of the or each connector device including within the housing an electronics section having one or more of:
- a filter;
- a combiner;
- a separator;
- an inductance;
- a sub-band communication apparatus;
- an indicator apparatus; and/or
- a power management device that is operatively connected to one or more said pins of the connector device.

An out-of-band (sub-band) communications apparatus has been developed that includes first and second data lines arranged in a differential pair. The data lines convey high speed data within a first frequency range and out of band data within a second frequency range that differs from the first frequency range. The apparatus also includes a band pass filter coupled to the first and second data lines. The filter only passes the out of band data and blocks the high speed data. The apparatus also includes a device coupled to said band pass filter and configured to at least one of transmit and receive out of band data.

Certain embodiments of such an arrangement may also include a transformer having a center power tap for one of adding and removing power from the first and second data lines. Alternatively, the filter may include a digital signal processor and an analog to digital converter configured to convert the out of band data to a digital signal.

Certain other variants on this arrangement may also include a filter configured to pass frequencies below 100 kilohertz. Optionally, the second frequency range of the apparatus may be between 100 hertz and 100 kilohertz. Alternatively, the second frequency range of the apparatus may be between 100 hertz and 20 kilohertz.

Such apparatuses may be incorporated into or may form the operational part of the distribution matrix, the connector device and/or the PoE control device of the invention. The scope of the invention therefore embraces all arrangements including sub-band communication apparatuses as described.

Furthermore the connection device may be or include one or more visual indicators (such as but not limited to LED's and other display devices). All such combinations lie within the scope of the invention.

In particularly preferred embodiments of the invention the or each connector device includes operatively secured thereto a patch cable. Thus the connector device may be used for conventional patching operations as well as for the addition of PoE functionality to a LAN. However it is equally possible, within the scope of the invention, to provide one or more of the connection devices omitting the patch cable, such that the connection devices serve primarily for connecting together the parts of the apparatus and any required PoE electronics in order to permit the addition of PoE functionality in a patch panel assembly.

When the connector device includes a patch cable as aforesaid, the patch cable preferably is operatively connected to the electronics section of the connector device. This allows the effective creation of a PoE arrangement, since (as indicated above) it is desirable that at least some of the LAN cables are used for the transmission of PoE signals.

Also the connection of the patch cables to the electronics sections of the respective connector devices allows the co-ordination of e.g. network messages generated by the PoE control device with those generated elsewhere (for example by a server connected to control the LAN, or from a LAN switch/repeater).

In a practical embodiment of the invention the first and second pins of each connector device are respectively of differing size, shape and/or cross-section. This means that the connector device can be inserted only "one way round" into the apertures in the distribution matrix. This in turn means that the electronics section of each connector device is not incorrectly connected when the connector device is inserted into the distribution matrix.

Conveniently the connector device is connectable simultaneously to a plurality of the first sockets of the network connection device.

It is also preferable that the connector device includes a plurality of the said first pins, whereby the connector device is connectable via a plurality of the through-going apertures.

A further, optional feature of the invention is the inclusion in the connector device of a plurality of the second pins.

According to a second aspect of the invention there is provided distribution matrix for use in conjunction with a cabling patch panel, the distribution matrix comprising a matrix support member having formed therein a plurality of through-going apertures and supporting a power bus.

According to a third aspect of the invention there is provided a connector device including a body having protruding therefrom first and second pins that are respectively for simultaneous insertion via a through-going aperture of a distribution matrix as defined and/or described herein and insertion into a power bus aperture thereof.

Optional features of the distribution matrix and the connector device are as set out hereinabove in relation to those aspects of the invention when considered as part of the assembly of the first aspect of the invention. A further feature is the incorporation into the assembly or the distribution matrix of one or more securing members (e.g. brackets) as defined and/or described herein.

BRIEF DESCRIPTION OF THE DRAWINGS

There now follows a description of a preferred embodiment of the invention, by way of non-limiting example, with reference being made to the accompanying drawings in which.

DETAILED DESCRIPTION

Figure 1:
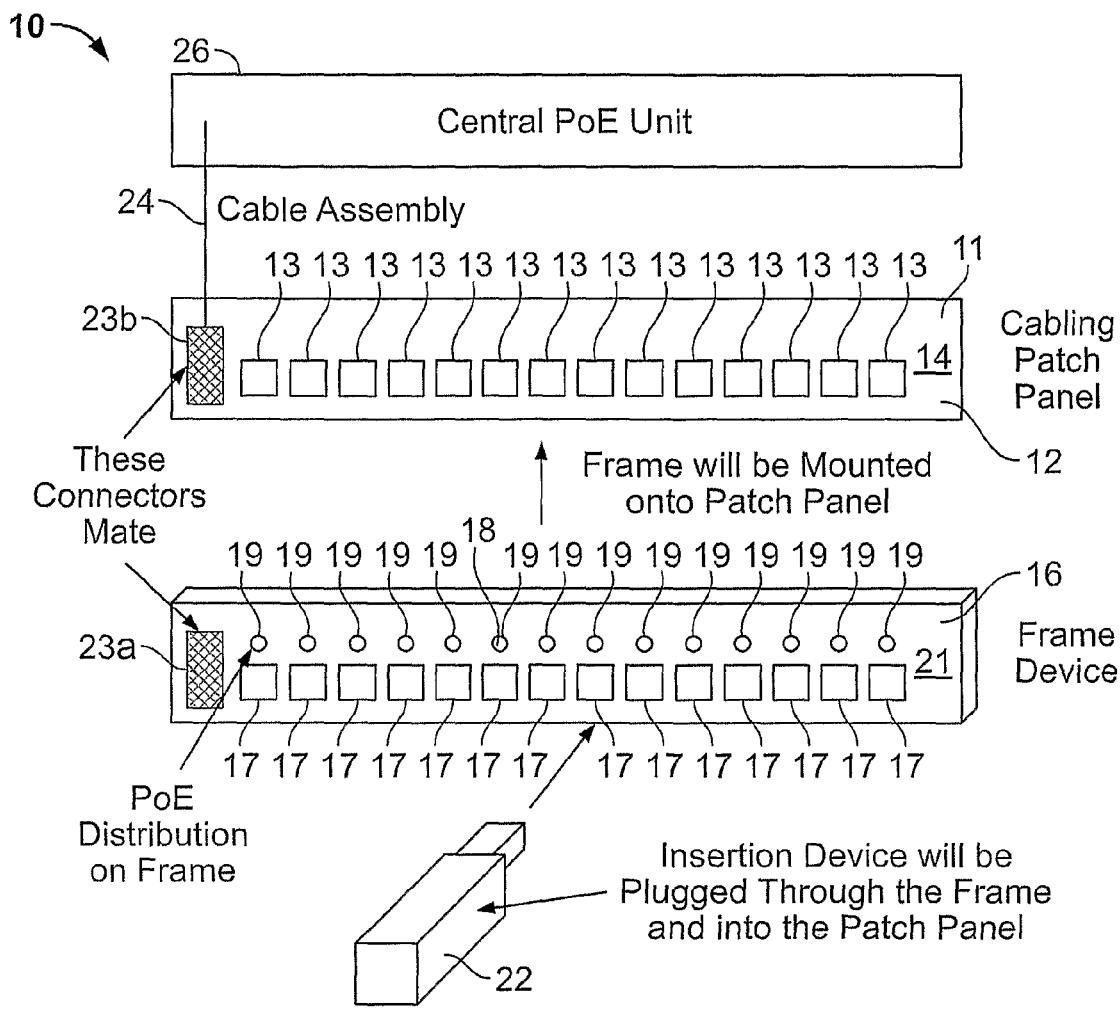
FIG. 1 is a schematic view of an assembly in accordance with the invention, including a PoE controller, a distribution matrix and one of typically several connector devices forming part of the assembly.

Referring to the drawings there is shown an assembly 10 according to the invention.

Assembly 10 comprises a network connection device in the form of a patch panel 11 that may be essentially or entirely of a per se known kind.

Thus the patch panel 11 includes in the embodiment shown a support member 12 in the form of a flat plate made e.g. of metal or a rigid plastics material.

Support member 12 supports on its rear side not visible in FIG. 1 a plurality of cable terminations that are each operatively connectable to a respective data cable for the transmission of data, each cable termination being operatively connected to a respective first socket 13 that is open on an in use front side 14 of the patch panel such that a plug inserted into the first socket is connectable to a said data cable via a data transmission path forming part of the patch panel. The patch panel 11 may be of the so-called PCB type or of virtually any other type known in the art.

A distribution matrix 16 is securable onto the front face 14 of the patch panel 11. Distribution matrix 16 is a generally laminar, rectangular plate of e.g. metal or a rigid plastics material. The dimensions of the rectangular elevation of the distribution matrix 16 are essentially the same as those of the front face 14 of the patch panel 11. Therefore when the distribution matrix 16 is secured so as to overlie the front 14 of the patch panel 1 the edges of the two components are substantially in register.

The distribution matrix 16 includes formed therein a plurality of through-going apertures 17. The apertures 17 are provided in number and location so as to correspond to and lie in register with the first sockets 13, when the distribution matrix 16 is secured so as to overlie the patch panel 11 as aforesaid. As a result it is possible to insert a member such as a plug through each through-going aperture 17 of the distribution matrix 16 so as to be received in the associated first socket 13 of the patch panel 11.

The distribution matrix 16 also supports a power bus 18. In the embodiment shown the power bus 18 is a conducting strip that extends between the left and right hand ends of the distribution matrix 16, embedded within it.

A series of power bus apertures 19 is formed in the in use front face 21 of the distribution matrix 16. It is possible to engage the power bus via the power bus apertures 19, so in the drawing figure the power bus 18 is visible through the power bus apertures 19.

In the preferred embodiment of FIG. 1 a respective power bus aperture 19 is formed in the distribution matrix 16 above each of the through-going apertures 17. Other patterns and arrangements of the apertures, as will occur to the worker of skill in the art, are within the scope of the invention.

Each power bus aperture 19 is suitable for receiving inserted therein a pin of a connector device 22 described in greater detail below.

In an alternative embodiment of the invention (not shown in the drawings) the power bus need not be embedded within the distribution matrix 16 and instead may be supported on the exterior thereof. In such an embodiment the power bus apertures may not be needed.

The distribution matrix 16 is securable to the patch panel 11 in overlying relation thereto by means of one or more fasteners.

One such fastener is represented schematically in FIG. 1 by the reference numeral 23.

Fastener 23 includes mutually mateable fastener parts 23a and 23b formed or secured respectively on the distribution matrix 16 and the patch panel 11. The fastener parts are such that a cable 24 connected to a PoE control device 26 may be connected to the sub-assembly defined by the patch panel 11 and the distribution matrix 16.

The PoE control device may be of any known kind and may include active circuits for managing PoE functions and/or passive components such as filters and rectifiers.

Regardless of the precise nature of the PoE control device at least the fastener part 23b is in the embodiment shown includes an operative connection to the power bus 18. As a result the power signals generated by and transmitted to the PoE control device may be transmitted also via the power bus 18. Hence such signals are available for receipt by any connector device 22 having a pin inserted via a power bus aperture 19. In practice, as described below, in almost all applications more than one connector device would be so connected.

Figure 2:
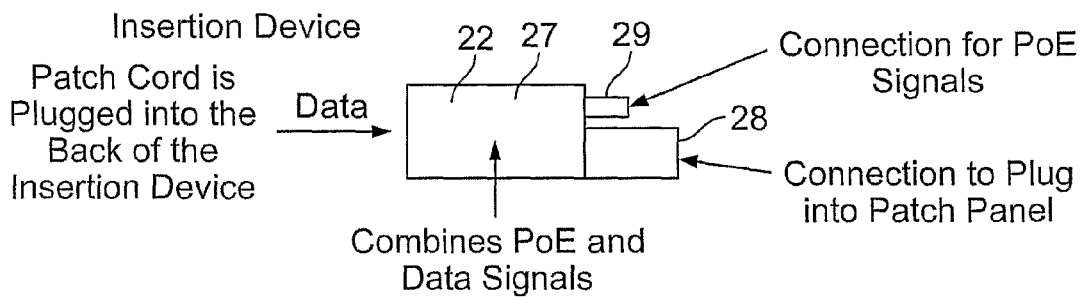
FIG. 2 is a detailed, schematic view of a connector device according to the invention.

Each connector device 22 preferably takes the form shown in FIG. 2.

In this arrangement a generally cuboidal housing 27 has protruding therefrom at one end a respective pair of conducting pins 28, 29 that are each capable of transmitting signals in the LAN.

The in use lower pin 28 of the pair is of a generally rectangular cross section sized to fit in to one of the through-going apertures 17 and extend therethrough to engage and be received in one of the first sockets 13 of the patch panel.

The in use upper pin 29 is of a different size and cross section to the lower pin 28. In the preferred embodiment the pin 29 is smaller in cross-section than pin 28 and is circular, although of course other designs are possible for both the lower pin 28 and the upper pin 29.

The cross sections of the upper pin 29 and the power apertures 19 are such that each pin 29 is insertable therein to engage the power bus 18. The lengths of the pins 28 and 29 are of course chosen to ensure the desired contacts. For this reason pin 28 protrudes from housing 27 further than does pin 29.

The pins 28, 29 are operatively connected within the housing 27 such that data and signals received by the respective pins 28, 29 may as desired be shared and/or distributed via the LAN. In the preferred embodiment of the invention the connection of the pins 28, 29 is achieved through the incorporation within the housing 27 of an electronics section (not shown in the drawings).

The electronics section may include one or more of e.g.:
a filter;
a combiner;
a separator;
an inductance;
a sub-band communication apparatus;
an indicator apparatus; and/or
a power management device;
operatively connected to one or more said pins of the connector device. The use therefore of mutually different pins 28, 29 ensures that the connector device 22 can only be connected to the distribution matrix 16 and the patch panel 11 "one way round". This ensures the correct connection of the electronics section.

Figure 3:
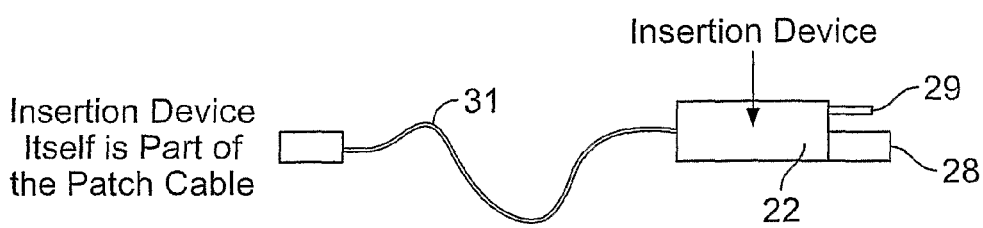
FIG. 3 shows the connector device of FIG. 2 when connected to a patch cable.

As best seen in FIG. 3, in a refinement of the assembly of the invention the connector device 22 may include operatively secured thereto a patch cable 31. The patch cable 31 is connected at least to the pin 29. As a result the patch cable 31 may be used for conventional patching operations.

In practical embodiments however the patch cable would be connected via the electronics section of the connector device 22 such that the patch cable may form part of an integrated LAN network in which data, commands and PoE messages and commands may be distributed in a controlled manner.

In reality of course a plurality of the connector devices 22 would be used as needed. Thus the assembly of the invention provides an easily installed, expandable PoE control arrangement that may readily be added to existing LAN structured cabling.

In a further refinement forming part of the invention the connector device 22 may include a plurality of the pins 28 whereby the connector device 22 is connectable simultaneously via a plurality of the through-going apertures 17 of the distribution matrix. Thus it is possible in such an arrangement for all of the plural pins 28 to engage and be received in a plurality of the first sockets 13. In another variant of the invention the plural pins 28 are not all of the same length, whereby not every pin extending into a through-going aperture 17 operatively engages a socket 13.

Using this arrangement virtually any combination of the through-going apertures and the sockets is connectable using the connector devices 22.

It is also possible within the scope of the invention for any of the connector devices to include a plurality of the pins 29.

Figure 4:
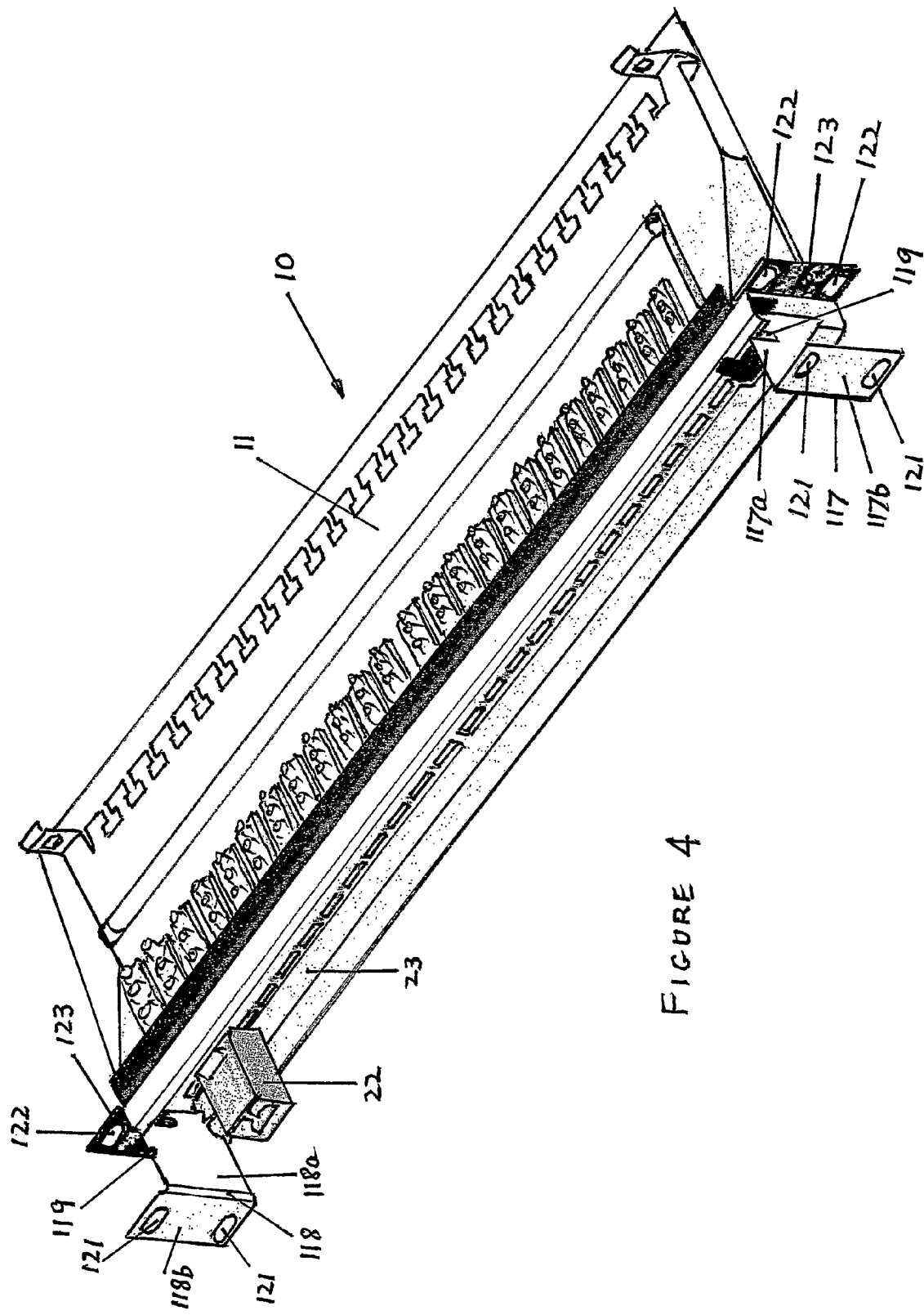
FIG. 4 shows in perspective view an assembly according to the invention, including adaptor brackets for spacing the components correctly when mounted in a patch cabinet.

In FIG. 4 there is shown in perspective view a practical embodiment of an assembly 10 according to the invention.

In FIG. 4 a largely or entirely conventional patch panel 11 has secured to its in-use front side a distribution matrix 16 having the characteristics described herein. One exemplary connector device 22 is shown with its pins received respectively in the through-going apertures and the power apertures of the distribution matrix 16, in the ways described hereinabove.

The distribution matrix 16 includes a frame in the form of a T-slot channel member 116. This provides a rigid support for the apertures, power bus and other parts of the matrix 16. The frame is secured onto the front of the patch panel e.g. by means of clips, screws or other fastenings.

The ends of the T-channel section member 116 have received therein respective spacer brackets 117,118. These may on construction of the assembly 10 be slid into the open ends of the channel until e.g. a notch 119 engages a co-operating formation in the channel so as rigidly to retain the brackets 117,118 in place each spaced a short distance from an end of the distribution matrix.

Each bracket 117,118 includes a forwardly projecting portion 117a, 118a that terminates in a cranked portion 117b, 118b.

The cranked portions 117b,118b are perforated by pairs of slots 121 that are similar to the slots 122 formed in the conventional securing tabs 123 of the patch panel 11.

The effect of the brackets 117,118 is, when screws or other fasteners are inserted into the slots 121, to permit securing of the assembly 10 in e.g. a rack of a per se known patch cabinet. The effect of the brackets 117,118 is to space the patch panel 11 rearwardly in the cabinet compared to where it would lie if secured instead by the conventional tabs 123. This in turn advantageously provides a clearance on the front side of the patch panel 11 to accommodate the matrix 16 and connector device(s) 22, without these parts of the assembly 10 fouling on a door or cover of the cabinet.

As noted the invention also resides in the distribution matrix 16 and the connector 22 when considered on their own.

The invention claimed is:

1. An assembly for permitting "Power-over-Ethernet" (PoE) connection between a PoE control device and the components of a cabling network, the assembly comprising
  a network connection device including one or more support members supporting a plurality of cable terminations that are each operatively connectable to a respective data cable for the transmission of data, each cable termination being operatively connected to a respective first socket that is open on an in use front side of the network connection device such that a plug inserted into the first socket in a connection direction is connectable to a said data cable via a data transmission path forming part of the network connection device;
  a distribution matrix that is securable onto the front side of the network connection device, the distribution matrix including a plurality of through-going apertures corresponding in number and location to the first sockets of the network connection device such that when the matrix member is secured on the network connection device a said aperture is functionally in register with each of the first sockets, and the distribution matrix spacing a front face of the through going apertures from the support member, and the distribution matrix including a power bus supported thereby between the front face of the through going apertures and the support member, the power bus of the distribution matrix being connectable to a PoW controller; and
  one or more connector devices being capable of connecting:
    via one or more said through-going apertures to a said first socket; and to the said power bus to receive power and/or power signals in dependence on the output of a PoE control device when connected to the power bus.

2. An assembly according to claim 1, including one or more fasteners for releasably fastening the distribution matrix and the network connection device, wherein the or each fastener includes mutually mateable fastener parts secured respectively on the network connection device and the distribution matrix, and the mutually mateable fastener parts define a cable connection for connecting a cable from a PoE control device to the power bus of the distribution matrix, at least a said fastener part secured on the distribution matrix being operatively connected to the power bus.

3. An assembly according to claim 1, wherein the power bus is embedded in the distribution matrix, and the distribution matrix includes formed therein a plurality of power bus apertures each permitting connection of a said connector device to the power bus.

4. An assembly according to claim 1, wherein the or each connector device includes a respective pair of protruding pins, a first of which is capable of extending through a said through-going aperture in the distribution matrix to engage a said first socket of the network connection device; and a second of which is capable simultaneously of engaging the power bus via a said power bus aperture.

5. An assembly according to claim 4, wherein the or each connector device includes a housing within which the first and second pins are operatively connected and includes within the housing an electronics section having one or more of:
   a filter;
   a combiner;
   a separator;
   an inductance;
   a sub-band communication apparatus;
   an indicator apparatus; and/or
   a power management device operatively connected to one or more said 25 pins of the connector device.

6. An assembly according to claim 5, wherein the or each connector device includes operatively secured thereto a patch cable, which is operatively connected to the electronics section of the connector device.

7. An assembly according to claims 4, wherein the first and second pins of the connector device are respectively of differing size, shape and/or cross-section.

8. An assembly according to claim 1, the distribution matrix of which includes secured thereto one or more securing members for securing the assembly in a housing so as to space the network connection device from a wall of the housing by a distance accommodating the distribution matrix and optionally one or more of the connector devices.

9. The assembly of claim 1, wherein the power bus extends transversely to the plurality of through going apertures.

10. A distribution matrix, the matrix being profiled for use with a network connection device and being securable onto the front side of the network connection device, the distribution matrix including a plurality of through-going apertures corresponding in number and location to first sockets of the network connection device such that when the matrix member is secured on the network connection device, an aperture is functionally in register with each of the first sockets, and the distribution matrix including a power bus, being connectable to a PoE controller, supported thereby with second sockets in communication with the power bus, and wherein the power bus of the distribution matrix is connectable to one or more connector devices via the second sockets.

11. A distribution matrix according to claim 10, supporting a power bus and including a connector part for connecting the distribution matrix to a patch panel, and including a further connector part operatively connected to the power bus.

12. A distribution matrix according to claim 10, wherein the or each connector device includes a respective pair of protruding pins, a first of which is capable of extending through a said through-going aperture in the distribution matrix to engage a said first socket of the network connection device; and a second of which is capable simultaneously of engaging the power bus via a said power bus aperture, the first and second pins are respectively arranged for simultaneous insertion via a through-going aperture.

13. A distribution matrix according to claim 12, and further comprising a PoE controller operatively connected thereto.

14. An assembly for permitting "Power-over-Ethernet" (PoE) connection between a PoE control device and the components of a cabling network, the assembly comprising:
   a network connection device including one or more support members supporting a plurality of cable terminations that are each operatively connectable to a respective data cable for the transmission of data, each cable termination being operatively connected to a respective first socket that is open on an in use front side of the network connection device such that a plug inserted into the first socket is connectable to a said data cable via a data transmission path forming part of the network connection device;
   a distribution matrix that is securable onto the front side of the network connection device, the distribution matrix including a plurality of through-going apertures corresponding in number and location to the first sockets of the network connection device such that when the matrix member is secured on the network connection device a said aperture is functionally in register with each of the first sockets, and
   a power bus, being connectable to a PoE controller, supported by the distribution matrix; wherein
   the distribution matrix includes a first connection interface defining the through-going apertures for receiving one or more connector devices, and the distribution matrix defining a second connection interface being connectable to the power bus to receive power from the power bus.

15. The assembly of claim 14, wherein the first and second interface are of different sizes.

16. The assembly of claim 15, wherein the first interface is larger than the second interface.

17. The assembly of claim 14, wherein the first and second interface are of different configurations.

18. The assembly of claim 17, wherein the first interface is rectangular and the second interface is circular.

19. An assembly according to claim 14, wherein the power bus is embedded in the distribution matrix, and the distribution matrix includes formed therein a plurality of power bus apertures each permitting connection of a said connector device to the power bus.

* * * * *